Jan. 6, 1953 R. D. CLEMSON 2,624,168
LAWN MOWER CONSTRUCTION
Filed Sept. 15, 1948 6 Sheets-Sheet 2

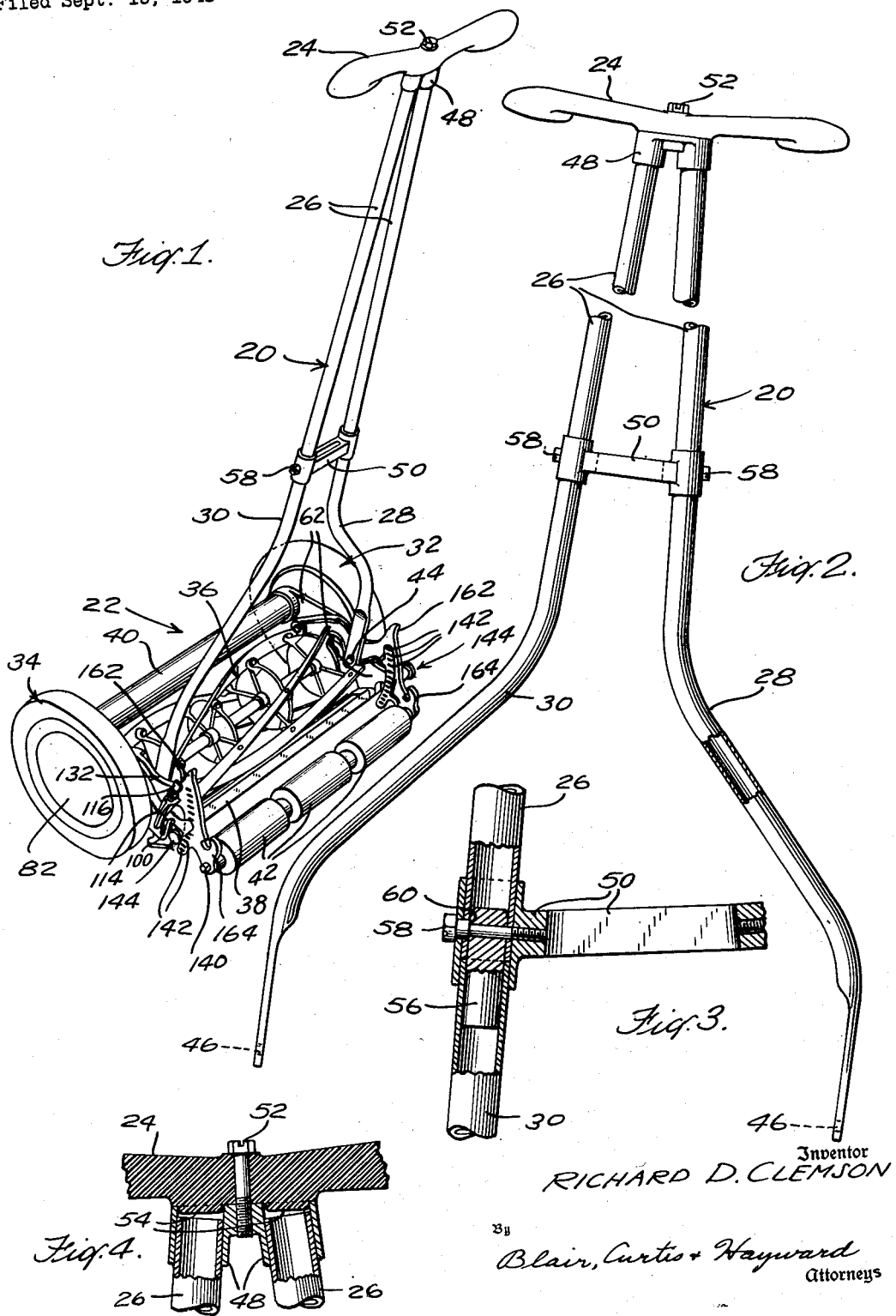

Inventor
RICHARD D. CLEMSON
By Blair, Curtis + Hayward
Attorneys

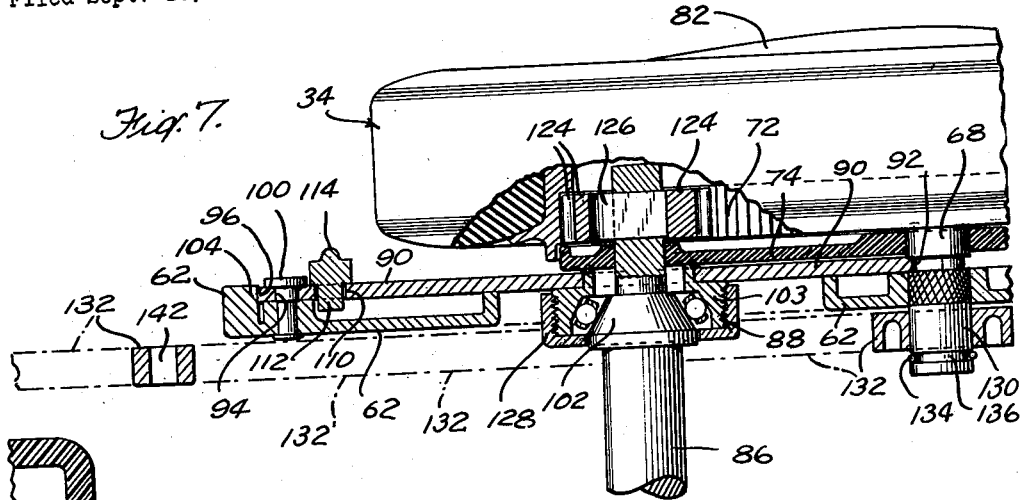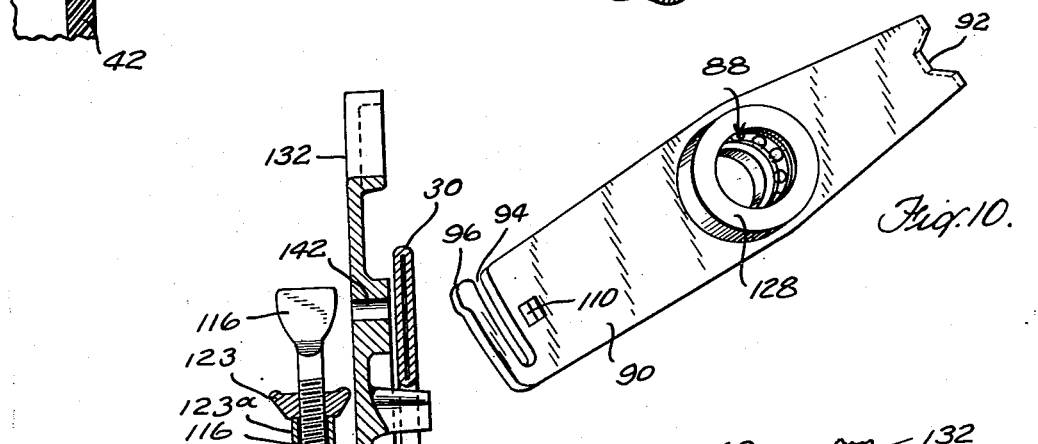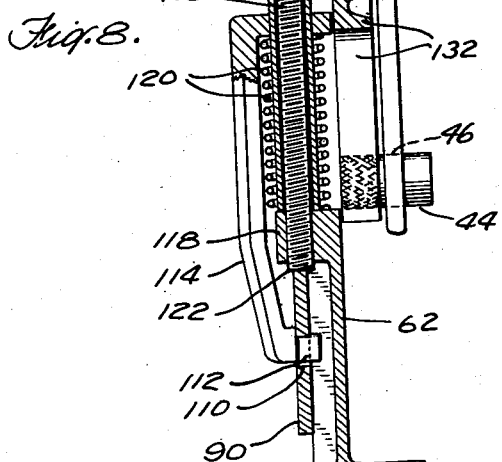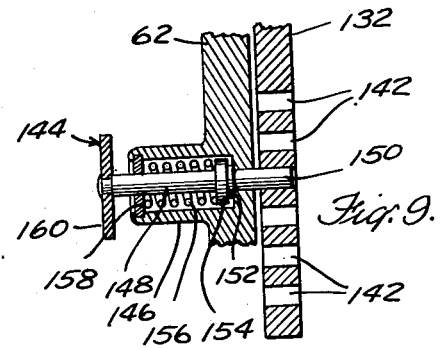

Inventor
RICHARD D. CLEMSON
Blair, Curtis + Hayward
Attorneys

Jan. 6, 1953 R. D. CLEMSON 2,624,168
LAWN MOWER CONSTRUCTION
Filed Sept. 15, 1948 6 Sheets-Sheet 5
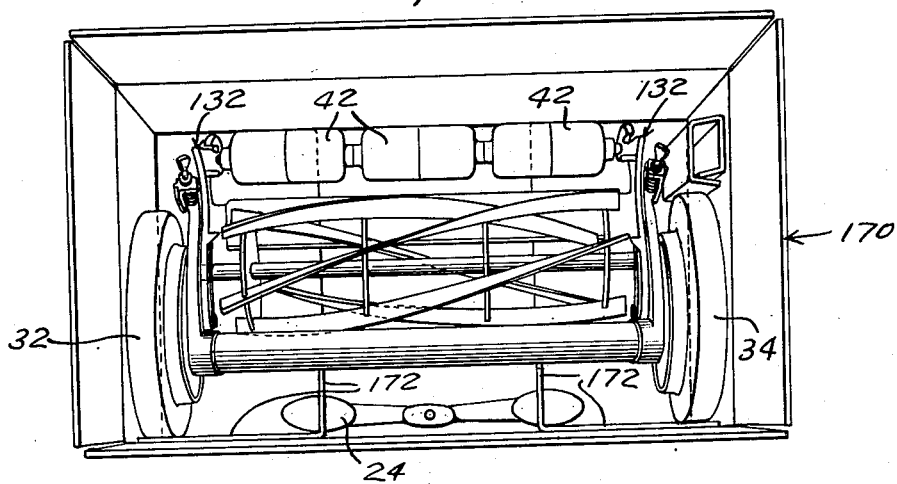
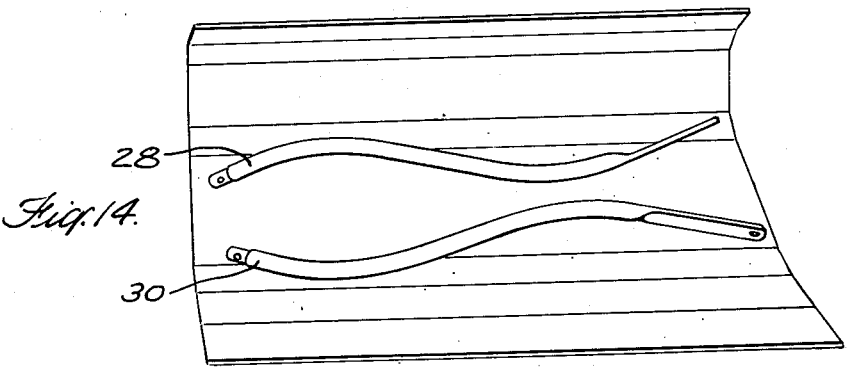
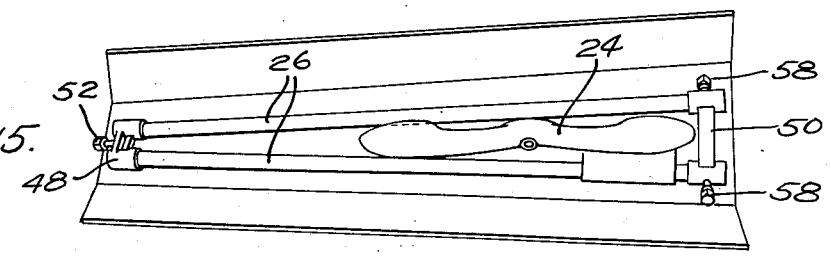
Inventor
RICHARD D. CLEMSON
By
Blair, Curtis & Hayward
Attorneys

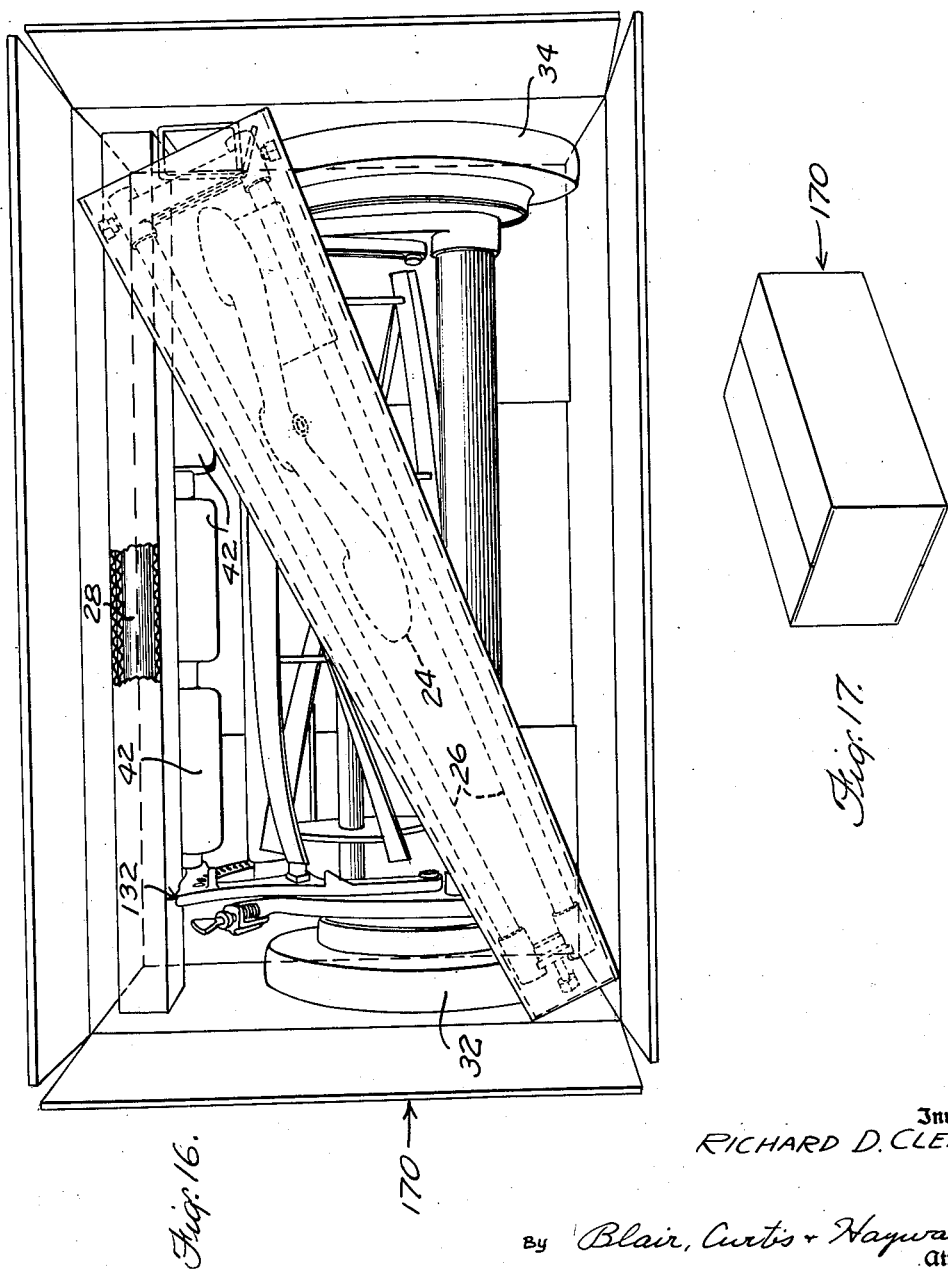

Patented Jan. 6, 1953

2,624,168

UNITED STATES PATENT OFFICE 2,624,168

LAWN MOWER CONSTRUCTION

Richard D. Clemson, Middletown, N. Y., assignor to Clemson Brothers, Inc., Middletown, N. Y.

Application September 15, 1948, Serial No. 49,362

7 Claims. (Cl. 56—249)

This invention relates to lawn mowers and more particularly to traction operated mowers designed to be pushed by hand.

It is one object of the invention to provide a lightweight mowing unit which can be manufactured and assembled on a mass production scale with a high degree of inherent accuracy. Another object of the invention is to provide a mower which not only will retain its high degree of built-in accuracy during ordinary working conditions but is easily adjusted, without need for tools, to adapt the machine to varying demands and conditions of use. A further object is so to simplify and so to devise a mower that the entire machine can be disassembled, serviced, or reassembled on a lawn or sidewalk, etc., with the use of only an ordinary screwdriver and wrench.

Prior to my invention a great variety of lawn mowers has been suggested and many have been manufactured and offered for sale. For many years relatively great weight was looked upon as a desirable attribute and practically essential to a satisfactory mower. Since the inventions of my prior Patents Nos. 2,330,680 and 2,332,892 and the commercial introduction of the mowers there set forth, this concept has changed so that more recently inventors and manufacturers have striven to combine lightness in weight and ease of operation with durability in use. Adjustability, at least of height of cut and as to tightness of the shear, is still regarded as essential for a commercially successful mower. In such machines, in order to accomplish the cutting efficiently and hold the shear blades in alignment so as to avoid rapid dulling and need for frequent resharpening and blade adjustment, relatively heavy and expensive bearings have been used. It has not been considered feasible to provide adjustment for wear in these bearings, but even with elaborate precautions to seal them, abrasive dirt will work into them tending to loosen the mountings and thus to lose the advantages of precision design and manufacture. It is an object of this invention therefore to provide self-adjusting bearing structures which will maintain for years of service the precision relationships of the cutting reel in the mower structure.

I have devised a lawn mower construction which overcomes certain of the disadvantages inherent in the mowers known heretofore and the parts for which can be easily and inexpensively mass-produced and which after its original manufacture can be disassembled and reassembled by any user, whether he be a mechanic or an amateur gardener without special jigs or fixtures; and it is one objective of my invention to achieve these characteristics and capabilities.

Another objective is the provision of a lightweight precision-type mowing unit which is easy to manufacture and which will withstand the adverse conditions of ordinary use over a long period of years. A further objective is the provision of an assembly of high rigidity against distortion but wherein the fly knife reel is capable of precise adjustment with respect to the bed knife. Still another objective resides in the provision of a simple mechanism whereby the height of the bed knife with respect to the earth may be selected at will and adjusted easily so as to give the height of cut which may be desirable in each particular locality at the time of cutting. Another object is to present a rugged and vibration resistant mechanism. A further objective is to make possible certain related mower assemblies and subassemblies in forms which can be mass-produced with an inherent accuracy of cooperation which results in lightness in weight and a resistance to deterioration over a period of years. Other objectives will in part be pointed out as the description proceeds and will in part become apparent therefrom.

The invention accordingly consists in the features of construction, combination of elements, methods of operation and arrangements of parts as will be exemplified in the structure and sequences and groups of related steps and assemblies to be hereinafter described and defined.

In this specification and the accompanying drawings I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in various forms, each as may be best suited to the conditions of a particular use.

In the drawings:

Figure 1 is a perspective view of a lawn mower embodying the invention;

Figure 2 is a view on an enlarged scale, and partly broken away, of the handle shown as a part of the lawn mower of Figure 1;

Figure 3 is a further enlarged fragmentary detail of a part of the handle illustrated in Figure 2;

Figure 4 is an enlarged fragmentary detail of another part of the handle illustrated in Figure 2;

Figure 7 is an enlarged detail taken along the irregular section line 7—7 of Figure 6;

Figure 8 is an enlarged detail taken along the section line 8—8 of Figure 6;

Figure 9 is an enlarged detail taken along the section line 9—9 of Figure 6;

Figure 10 is a perspective view of a spring plate and cone bearing assembly forming a part of the invention;

Figure 13 shows the cutting unit of the mower positioned in a shipping carton;

Figure 14 shows a part of the handle assembly about to be wrapped in a sheet of cardboard;

Figure 15 shows another part of the handle assembly about to be wrapped in cardboard;

Figure 16 shows the cutting unit assembled in a carton with the wrapped parts of the handle assembly; and Figure 17 is a perspective view of a shipping cartoon containing the disassembled mower.

Figure 5:
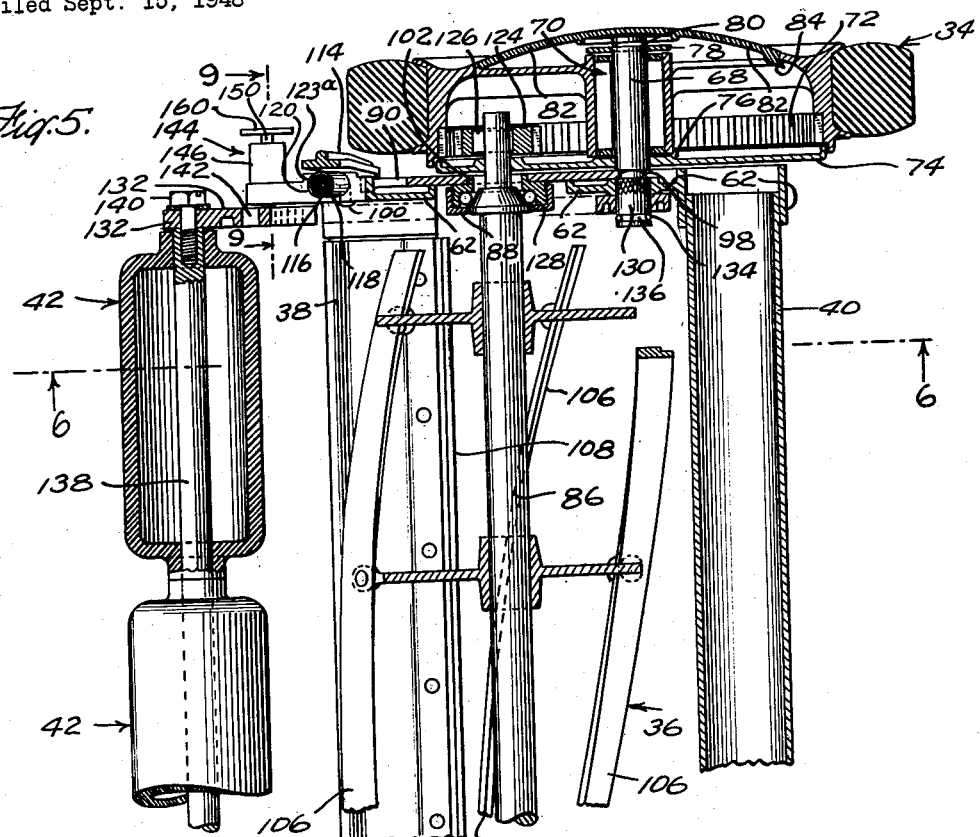
Figure 5 is a sectional view taken along the irregular section line 5—5 of Figure 6.

In Figure 1 a lawn mower illustrating one embodiment of the invention is generally shown consisting of a handle 20 and a cutting unit 22. The handle includes a double grip 24, a pair of posts 26, and right and left forks 28 and 30, respectively. The cutting unit 22 includes a right wheel 32, a left wheel 34, a reel generally indicated at 36, a bed knife 38, a tie-tube 40 and a ground roller 42. Handle unit 20 is mounted upon cutting unit 22 by bosses 44 formed on portions of the unit and cooperating with openings 46 in the handle forks.

As shown in Figure 2, posts 26 are permanently secured together at the top by a casting 48 and at the bottom by a casting 50 (see also Figures 4 and 3). In practice it has been found that the seamless tube posts can be joined by casting the parts 48 and 50 onto them, particularly if their ends are first knurled or drilled to provide a key. The result is an integral unit, substantially indestructible under ordinary operating conditions. This integral post unit is secured to the double grip 24 (see Figure 4) by a bolt 52 which passes downwardly completely through the grip and is threaded into a central metal mass in casting 48. A pair of nubs 54 are formed on the grip portion and are seated in a pair of cooperating openings in the upper surface of the casting in alignment with the ends of posts 26.

Forks 28 and 30 are demountably carried in casting 50. In Figure 3 fork 30 is shown to be provided in its upper end with a slug 56 which is permanently carried, as by a drive fit, in the end of the seamless tube fork and about one half of which projects upwardly therefrom. The projecting upper portion of slug 56 is provided with a transverse bore transfixed by a collarbolt 58 which is provided with a collar 60 which may be integral or merely slipped over the bolt. This bolt is threaded directly into the heavy metal mass of casting 50.

The upper end of fork 30 is fitted into the casting and the projecting portion of slug 56 is snugly received in the bore in the lower end of post 26. It will be observed that the openings in the outer wall of casting 50 and post 26 through which bolt 58 passes are of diameters to accommodate collar 60, but to be covered by the head of the bolt. Collar 60 thus is in bearing engagement with the left-hand surface (in Figure 3) of slug 56 and further tightening of bolt 58 simply squeezes slug 56 between collar 60 and those portions of casting 50 and the lower end of post 26 with which the bolt coacts. Thus it is possible using an ordinary wrench or screw driver to make an extremely tight and effectively permanent connection between the casting and the fork without danger of unwittingly cracking or collapsing the shell-like portions of casting 50 or of hollow post 26. This foolproof coupling makes practicable a lawn mower which can be shipped in a single carton about the over-all size of the mowing unit.

Figure 11:
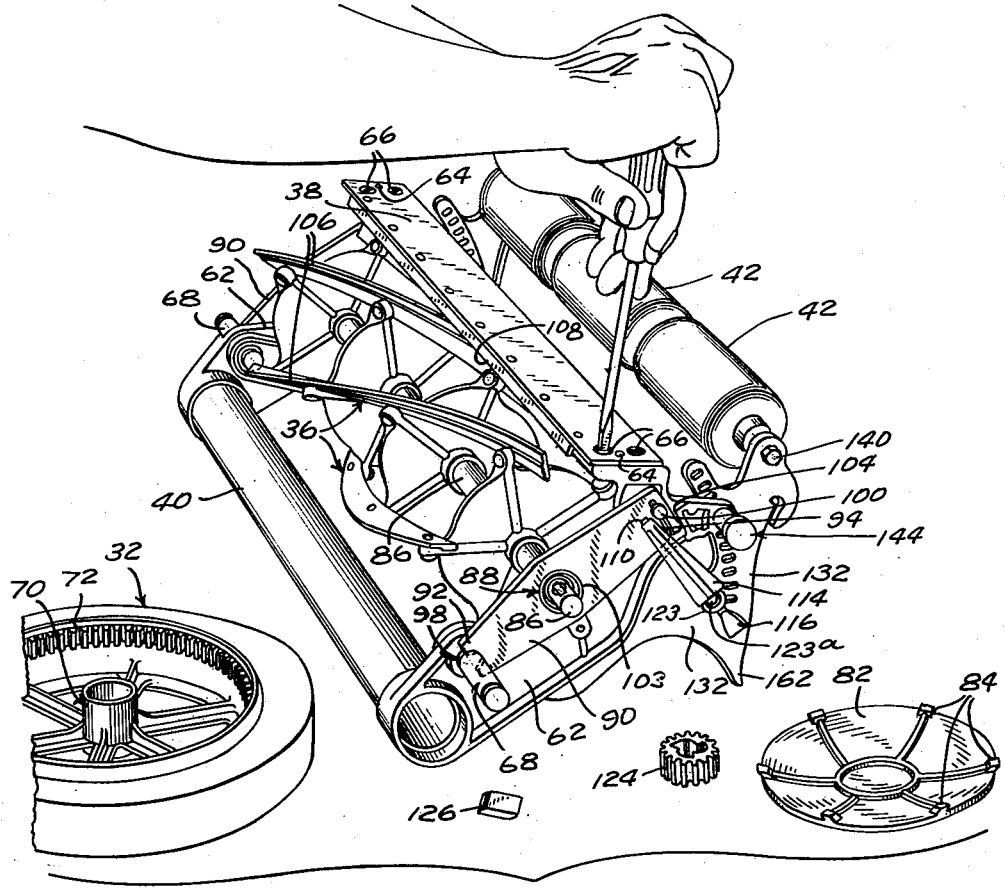
Figure 11 is a perspective view of one of the principal assemblies and some of its related parts.

As shown in Figures 1 and 11, cutting unit 22 is based upon a rigid frame comprising a pair of parallelly disposed side members 62, and the tie-tube 40 and bed knife 38 extending therebetween. During the manufacturing process, the side members 62 are die cast one on each end of tie-tube 40, and thus given a permanent, rigid and precision relationship. Only the alignment faces 63 (see Figure 8) require machining and that is done with a precision jig positioned on the insert studs 68 and 100 (to be described), whereby the alignment faces 63 are accurately positioned, and proper alignment of the bed knife with the other parts is assured. Thereafter the bed knife is positioned upon the alignment seats 63 at the ends of side members 62 and drilled through into the side members. The dowel seats in the bed knife and the ends of plates 62 are thus drilled, or otherwise prepared, while the parts are precisely held in a simple jig so that each part is exactly located. A pair of dowel pins, one of which is shown in Figure 8, is fitted in the resulting holes to assure a precise and rigid, but removable, connection. After the parts have been assembled with the dowel pins 64 in place they are solidly fastened together by heavy flat head machine screws 66 (see Figures 8 and 11) or other available fastenings. The length of the tie-tube and the distance between dowel pin centers can be held, with only routine shop practices, within exceedingly fine tolerances and so the rigid frame which results provides a permanently true base on which to build the mowing assembly.

Side members 62 also carry wheel studs 68 (see Figures 5 and 11). These wheel studs can be made of steel and machined to provide an accurate bearing surface, after which they can be secured in situ as inserts in the casting, as described in the case of the tube 40, and thus become made an integral part of the frame.

As shown in Figure 5, wheel 34 is provided with a central roller bearing construction generally indicated at 70 which turns upon wheel stud 68. On the inside of the wheel is formed a conventional ring gear 72, to be described in more detail hereinafter. A plastic dust cover 74 provided with a spacing nub 76 is positioned on wheel stud 68 inside of the wheel. A thrust washer 78 and clothespin-type retainer spring 80 retain the wheel, with bearing 70 in aligned position, upon the wheel stud. A plastic hub cover 82 (see also Figure 1) is snapped into the rim over the outer central portion of the wheel and is itself held in place by lugs 84 (see Figures 5 and 11) which engage the inner periphery of the wheel opening and permit the rest of the cover to be of very light gauge. As this plastic may have a tendency to slow shrinkage, it is initially made appreciably oversize and is domed, as best shown in Figure 5, so that it can be stressed in compression and the oversize resiliently accommodated in the dome when it is snapped into the ring.

As pointed out previously, tie-tube 40, side members 62, and bed knife 38 together form an absolutely rigid and precisely dimensioned frame, which frame carries integrally therewith the wheel studs 68 so that the frame is securely supported upon the wheels and itself can form a support for the other parts of the cutting unit as will now be described.

Reel 36 is based upon a central reel shaft 86 (see also Figure 5) which shaft is carried in and between axially loaded cone bearings 88 mounted in spring plates 90. As shown in Figure 10, each spring plate 90 includes a fork 92 at one end, and a slot 94 and foot 96 at the other. The cup-race of the cone bearing 88 is centrally disposed between the two ends of the spring plate. Each wheel stud 68 includes at its base a groove 98 which, as shown in Figure 11, forms a pivot seat for the forked end 92 of the associated spring plate. At its other end the spring plate is retained in the desired position upon side member 62 by a headed pin 100 (see Figures 11 and 7) which cooperates with the spring slot.

In assembling the parts, forked end 92 is seated in groove 98 and a press fitted cone 102 (see Figures 7 and 5) on reel shaft 86 is seated on the balls in a ball race 103 of cone bearing 88. The position of ball race 103 on the spring plate is such that it holds the spring plate, when unstressed, away from the side member. The other end of the spring plate is then pressed down, so as to bend it elastically, and is engaged with side member 62 by sliding the foot 96 along loading guide 104 so that the headed pin 100 enters slot 94. The shape of the slotted end of the spring plate is such that foot 96 possesses sufficient resilience to act as a spring to take up any play and hold the end 92 securely pressed into the groove 98. Simultaneously groove 98 prevents movement of the forked end of the spring plate outwardly along the wheel stud, while the head on pin 100 prevents the slotted end of the spring plate from moving away from side member 62.

Thus, as shown in detail in Figure 7, it is possible for the spring plate, once it is clamped in position, to perform and maintain a resilient loading on the cone bearing 88. And since this mounting construction is repeated at the other side of the cutting unit, the reel shaft itself is always under yieldable endwise compression between the cone bearings in which it floats. This gives a cushioning against shocks which helps to avoid dulling the reel, and an automatic and perfect alignment and avoids "play" in the bearings. Because of the spiral reel there is a re-action thrust against one end of the reel (the left as shown) due to the camming action of the fly-knives against the bed knife or against the grass, etc., being cut. It is advantageous, according to this invention, to make the spring plate 90 at this end more rigid (i. e. with higher load deflection rate) and to have most of the resilient loading performed by the opposite spring plate, which will therefore be more resilient (i. e., of lower load deflection rate). This is achieved either by use of different metals for these plates at the two ends or of slightly different dimensions, preferably different thickness. The dimensions of the parts 96 will in such case best be varied to give approximately the same endwise force and a balanced yield to a shock on the reel.

It will be observed that the forked ends 92 of each of the spring plates 90 are pivotable, respectively, about the coaxial wheel studs so that, as the slotted ends of the spring plates are moved upwardly or downwardly with the headed pins 100 standing in the slots 94, the position of the reel will always be positively oriented with respect to the rigid frame upon which the spring plates are positioned. Accordingly, the relationship of the reel with respect to the bed knife, which is a part of the rigid frame, may be predetermined for purposes of cutting adjustment. And so, as shown for example in Figures 6 and 11, the cutting adjustment of fly knives 106 with respect to the cutting edge 108 of bed knife 38 may be determined to a nicety by correct selection of the angular position of the spring plates about the axis of the wheel studs.

In order to fix the cutting adjustment between fly knives and bed knife, I have provided an adjustment mechanism between the slotted end of the spring plate and the adjacent portions of the side member of the rigid frame. As shown in Figure 10, the spring plate includes near its slotted end an opening 110. This opening receives one end 112 (see also Figure 8) of a bracket 114, the other end of which is transfixed by an adjustment screw 116. When the parts are assembled, as shown in Figure 8, screw 116 is threaded through a boss 118 which is integrally cast as a part of side member 62. A compression spring 120 is carried upon screw 116 between the upper portion of bracket 114 at the top, and the upper surface of boss 118 at the bottom. The action of this compression spring tends at all times to hold spring plate 90 against the lower end 122 of screw 116. Thus, as shown in Figure 8, when screw 116 is advanced downwardly by threading it into boss 118, compression spring 120 is further loaded and the slotted end of spring plate 90 is tightly held by the action of loaded spring 120 against end 122 of the adjustment screw. Screw 116 is locked in its adjusted position by a wing nut 123 threaded on the shank of the screw. The wing nut bears against sleeve 123a, which sleeve is abutted at its lower end against boss 118 through which the adjustment screw is threaded. As shown also in Figure 11, during the adjustment, spring plate 90 is maintained in compression between wheel stud 68 at one end and loading guide 104 at the other. And reel 36 is held between the loaded cone bearings 88 by the abutment actions of a groove 98 at one end of each spring plate and a headed pin 100 at the other.

It will also be appreciated that the function of the adjustment bracket 114 and screw 116 is such that no matter what the adjustment (see Figure 8), the slotted end of the spring plate cannot pivot upwardly because of the fixed abutment formed by screw end 122. But if a shock is experienced by the fly knives, it can be absorbed in two ways: The slotted end of the spring plate can move away from end 122 by further compression of spring 120 (see Figure 6), and the cone 102 can move laterally in the bearing 88; and as soon as the shock has dissipated itself, the adjusted position of the reel with respect to the bed knife is accurately and positively and instantly reestablished.

Each end of reel shaft 86 carries a pinion 124 coupled to the slotted end of the shaft with a shuttle piece 126, which construction as here shown embodies the invention of Canfield Patent No. 2,330,677. As is well known, the pinion and shuttle piece function as an over-running clutch such that when the pinion is meshed with ring gear 72 and is driven thereby in one direction, it will drive the reel shaft 86, but it will not drive it in the other direction.

The ball-bearing mechanism which forms a part of each spring plate is enclosed and substantially sealed (see Figure 7) against foreign matter on the one side by a plastic shell 128, which also aids in retaining the ball assembly when the reel shaft and its cone 102 are removed, and on the other side by the plastic cover 74, which is fitted tightly against the end of the ball race 103. Shell 128 is threaded onto the outside of the hub of the ball race and there is close but substantially frictionless fit between the inner rim of shell 128 and the periphery of cone 102, with the latter projecting slightly beyond the former, so that it can throw off by centrifugal force dirt particles, water, etc., which otherwise might tend to work into the bearing. Thus I protect the high quality bearings which my mower construction makes feasible.

As pointed out above, the relationship between the cutting edges of the fly knives and the cutting edge of the bed knife can accurately be adjusted and maintained. The only other adjustment required is of the cutting mechanism as a whole vertically so as to enable it to be employed to cut grass to a selected height. According to the present invention, I have made this as simple and rugged as the shear adjustment already described.

Figure 6:
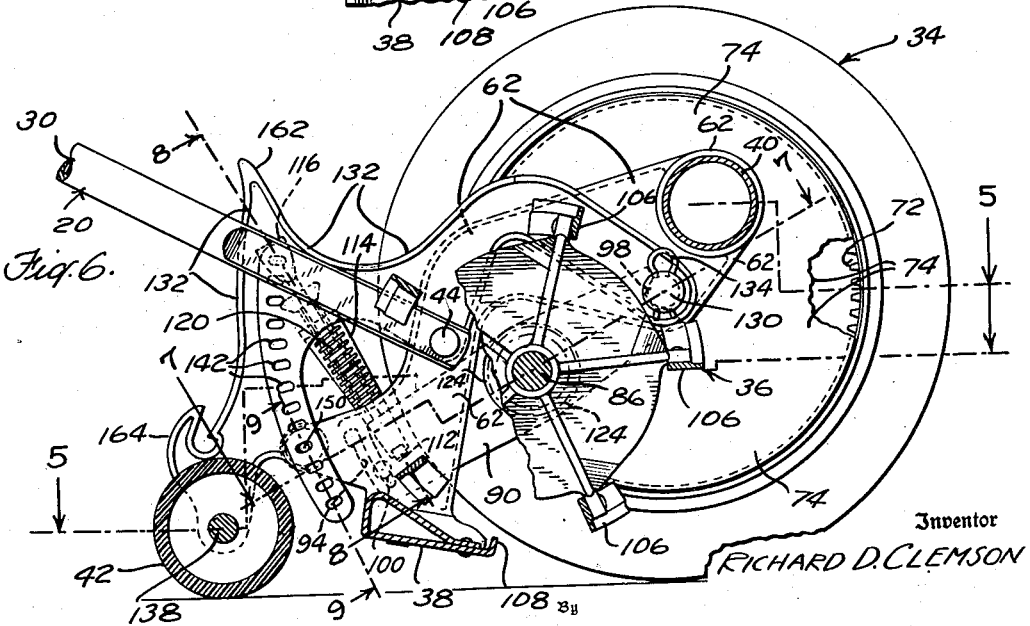
Figure 6 is a sectional elevation taken along the line 6—6 of Figure 5.

As shown in Figure 5, each of the wheel studs 68 is extended inwardly a short distance from the inner surface of its side member 62 to provide a pivot bearing 130 (see also Figure 7). Upon each bearing 130 is journalled a sector plate 132 (see also Figure 1). Each sector plate is held upon its bearing 130 and against its side member 62 by a clothespin-type spring retainer 134, carried in a groove 136 on the bearing stud 130. As shown in Figures 5 and 6, the rearward and lower portions of sector plates 132 provide a support for a ground roller shaft 138 held between plates 132 by a pair of bolts 140; and the latter, by being securely bolted to the sector plates gives rigidity to the entire ground roller assembly.

As shown in Figure 1, each of the sector plates is provided with a series of openings 142 (see also Figure 6). Each side member 62 of the rigid frame carries a locking pin assembly indicated at 144 and shown in detail in Figure 9. As shown in Figure 9, side member 62 as cast includes a hollow projection or sleeve 146 in which is concentrically disposed a locking pin 148 one end of which projects all the way through the plate to provide a detent portion 150 for cooperating with openings 142 in juxtaposed sector plate 132. Pin 148 carries a shoulder 152 which forms a seat for a washer 154 providing a base for a compression spring 156 held within sleeve 146 by another washer 158. Washer 158 is permanently secured within the end of sleeve 146 by spinning over the outer edge of the sleeve. A head 160 is riveted on the end of pin 148 after washers 154 and 158 and spring 156 are assembled thereon, and this head 160 projects beyond the sleeve 146 so that it can be readily grasped by thumb and finger and pulled back against the action of spring 156; detent portion 140 is thereby withdrawn from openings 142 in the sector plate. Thus, by pulling out the opposing locking pins, the rearward ends of the side members can be swung upwardly or downwardly at will and locked in a selected position with respect to the sector plates supported upon ground roller 42. In this way the height of the bed knife may be adjusted with respect to the surface of the ground. Since the handle is pivoted at 44 on these sector plates and the sector plates themselves are pivoted at the axis of the wheels, the action of the handle, i. e., the angle and point of application of the applied force, is not affected by the adjustment of the height of cut. The location of the pivots 44 and the length of handle 20 to its upper end are designed to assure that, in all normal operating positions of the handle, the plane through the center of the handle grips and the axis of pivots 44 passes behind the points of contact of wheels 34 on the ground. This is covered by my Patent No. 2,152,278.

Figure 12:
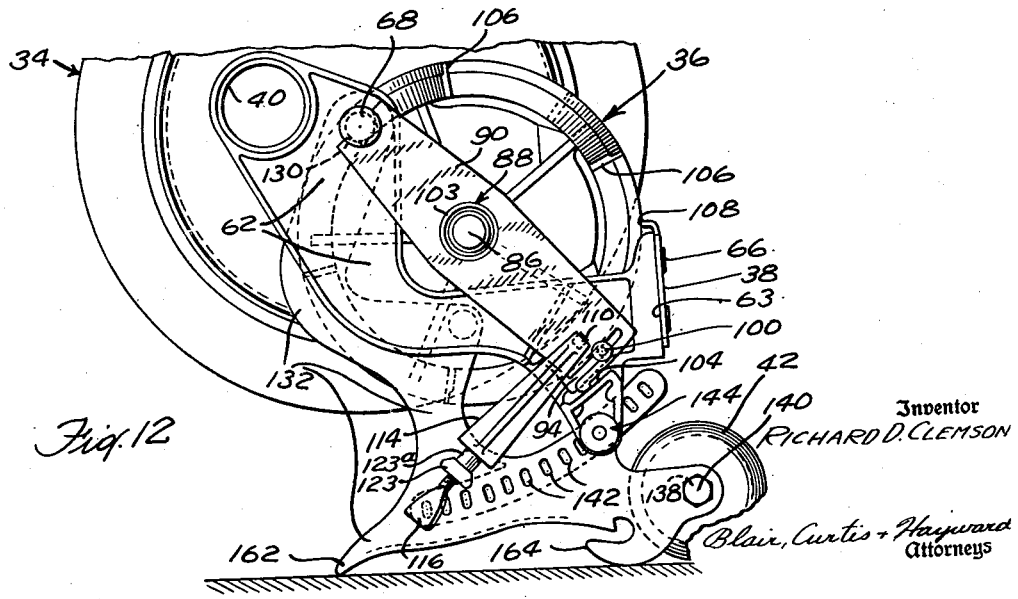
Figure 12 is an end elevation of the mowing unit with the near wheel and related parts removed.

As shown in Figure 1, each sector plate 132 is provided with an upwardly extended projection 162 and a rearwardly extending projection 164. Figure 11 illustrates how the partly assembled mowing unit may be solidly supported in inverted position while resting upon tie-tube 40 and projections 162 thus facilitating assembly and disassembly. Figure 12 shows another relationship wherein the cutting unit is solidly supported upon projections 162 and 164. It will be observed that the unit will stand firmly on any flat surface in this position for various assembly or cleaning operations and also when storing the mower. This is also important for shipping in cartons or packing cases, as it holds the frame securely in one position, if one side of the case or carton (advantageously a reinforcing board in the case of a paper carton) is engaged by these parts 162 and 164. The part 164 is made in the form of a hook suitable for mounting a grass catcher.

In Figure 13 is shown a mower of my invention packed in a carton 170. The disposition of the parts there shown permits safer and more economical shipment and also enables compact and convenient storage during the winter months. As there shown, the box is rectangular in form and substantially fitted to the mower so that it is held snugly in place with the wheels 32 and 34 against the front and bottom of this box, the rollers 42 against the bottom and back, and the sector plates 132 spaced from the back and top by an amount and for the purpose described below.

The handle is removed from the studs 44, either by springing the tines 28 and 30 of the forked end toward one another sufficiently to clear the end of one stud 44 or by removing coupling bolts 58 and uncoupling the upper handle section 26—48—50 of the handle, whereupon the tines 28 and 30 drop free. In either case, the handle is separated, before or after its removal, by removing bolts 58 and pulling the shaft of each tine with its male splicing member, the tenon slug 56, out of the female splicing member, the casting 59. The handle as shown is articulated approximately at the midpoint along its length, and each section is of length approximately the width of the mower. Thus when the handle is separated as just described and the handle grip or crossbar 24 has been removed (by removal of bolt 52), each of the handle sections can be received in the box. The upper section is hung over the rear with the projections 162 extending between the shafts 26 and protected therefrom by a cushioning paper of cardboard, etc.; the tine shafts 28 and 30 are laid beside the shaft 26 on top of the sector plates 132; and the handle grip 24 is mounted in holes in edgewise spacers 172.

Alternatively, fork sections 28 and 30 are separately wrapped in cardboard, as shown in Figure 14, and shaft section 26 is wrapped in cardboard, as shown in Figure 15, with handle grip 24 secured to a shaft 26 by packing material. The package containing fork sections 28 and 30 is slipped into carton 170 between the cutting unit and the back wall (see Figure 16) and the package containing the handle grip and upper parts of the shaft are laid inside of carton 170 across the top of the cutting unit.

Although I have shown in the drawings and described in detail above the embodiment which I now regard as most advantageous for commercial development, I have successfully embodied the invention and demonstrated it in other forms.

From the foregoing it will be seen that a lawn mower made in accordance with the present invention is well adapted to attain the ends and objects hereinbefore set forth and to be economically manufactured since both the assembled article and the methods of making it are suited to common production methods and are susceptible to a wide latitude of variations as may be desirable in adapting the invention to different applications.

I claim:

1. In a lawn mower construction: a rigid frame including opposite side members, a bed knife secured thereto and extending therebetween, and a pivot abutment formed in at least one of the side members; a fly knife reel extending transversely across the space within the frame between the side members and in cutting relationship with respect to the bed knife; and a spring plate disposed on the side member of the frame and serving to support the reel; said spring plate including a bearing construction in which the shaft of the reel turns, a pivotal engagement with said pivot abutment of the adjacent side member, and a selective connection between its rearward end and a rearward portion of the adjacent side member, whereby the spring plate can pivot within a substantial range about the pivot abutment when said connection is released, and is capable of being secured selectively at any of various positions in said range, said spring plate normally being held in flexed condition by said pivot abutment and selective connection to apply resilient pressure through said bearing construction upon said reel.

2. In a lawn mower construction: a rigid frame including a pair of side members, a bed knife secured thereto and extending therebetween, and wheel studs on the side members and respectively projecting oppositely outwardly therefrom; a fly knife reel extending transversely across the space within the frame between the side members and in cutting relationship with respect to the bed knife; a pair of spring plates disposed one on each side of the frame and serving to support the reel; each spring plate including a bearing construction in which the shaft of the reel turns, a pivotal connection between its end and the wheel stud of the adjacent side member, and a sliding connection between its rearward end and a rearward portion of the adjacent side member, whereby the spring plate can pivot about the wheel stud within the limits of the sliding connection; and an adjustment screw mechanism connecting adjacent spring plates and side members in the region of their slidable connection.

3. In a lawn mower construction: a rigid frame including a pair of side members, a bed knife secured to the side members and extending therebetween, and wheel studs on the side members and respectively projecting oppositely outwardly therefrom; a fly knife reel extending transversely across the space within the frame between the side members in cutting relationship with respect to the bed knife; and a pair of spring plates disposed one on each side of the frame and serving to support the reel; each spring plate including a cone bearing construction in which the shaft of the reel turns, a connection between one end of each spring plate and the wheel stud of the adjacent side member, and a connection thereon beyond said cone bearing between said spring plate and the adjacent side member; each spring plate, at its said connection with its adjacent side member, being restrained against lateral movement away from its side member, and each spring plate being held with its end stressed toward the reel, whereby the central portions of the spring plates are spring-loaded toward, and tend to oppose, each other and thereby to hold the cone bearing constructions under axial pressure.

4. In a lawn mower construction: a rigid frame including a pair of side members, a bed knife supported upon rearward portions thereof and extending therebetween, and studs disposed in forward portions thereof and projecting therefrom; a fly knife reel extending transversely across the frame in cutting relationship with respect to the bed knife; and a pair of spring plates disposed one on each side of the frame and serving to support the reel; each spring plate including a cone bearing construction in which the shaft of the reel turns, a pivotal connection between its forward end and the stud of the adjacent side member, and a sliding connection between its rearward end and a rearward portion of the adjacent side member, whereby the spring plate can pivot about the wheel stud within the limits of the sliding connection; each pivotal connection including an arcuate groove in the stud and a groove-fitting recessed edge on the spring plate whereby axial movement of the spring plate along the stud is restrained, and each sliding connection including a headed pin projecting from the side member and a slot in the spring plate receiving the stem of the pin with the head of the pin overlapping the slot and holding the spring plate against lateral movement away from the bed plate, and said spring plates being stressed to exert axial loading upon the cone bearing constructions and the reel shaft.

5. In a lawn mower construction: a rigid frame including a pair of side members, a bed knife supported therein and extending therebetween, a fly knife reel extending transversely across the frame in cutting relationship with respect to the bed knife, and a pair of spring plates disposed one on each side of the frame and serving to support the reel; each spring plate including a cone bearing construction in which the shaft of the reel turns, a pivotal connection between said spring plate and the adjacent side member, and a sliding connection between its other end and another portion of the adjacent side member, whereby the spring plate can pivot about said pivotal connection within the limits of the sliding connection; each pivotal connection including an arcuate face on the side member and a matching edge on the spring plate whereby movement of the spring plate is restrained to pivoting about said connection; the spring plates being stressed to exert axial loading upon the cone bearing constructions and the reel shaft; and an adjustment mechanism positioning the end of each spring plate in the region of its slidable connection with respect to said frame.

6. In a lawn mower construction: a rigid frame including a pair of side members, a bed knife supported upon rearward portions thereof and extending therebetween, and wheel studs disposed in forward portions thereof and projecting in opposite directions therefrom; a fly knife reel extending transversely across the frame in cutting relationship with respect to the bed knife; a pair of spring plates disposed one on each side of the frame and serving to support the reel; each spring plate including a bearing construction in which the shaft of the reel turns, a pivotal connection between its forward end and the wheel stud of the adjacent bed plate, and a sliding connection between its rearward end and a rearward portion of the adjacent bed plate, whereby the spring plate can pivot about the wheel stud within the limits of the sliding connection; a shear adjustment mechanism between the frame and the spring plates; a ground roller assembly including a pair of sector plates pivotally mounted at their front ends one on one side member and the other on the other side member, and a ground roller extending between and connecting rearward portions of the sector plates; and a height-of-cut adjustment mechanism between the frame and said assembly, including a bolt pin in one of them and a plurality of seats in the other angularly spaced about the pivotal mounting, whereby the pivotal relationship between the frame and said assembly may be selected and locked.

7. In a lawn mower construction: a unitary rigid frame including a tie-tube across the front, a side member extending rearwardly from each end of the tie-tube, a bed knife across the back extending between rearward portions of the side members, and a wheel stud projecting outwardly from each side member; a ground roller assembly including a pair of parallelly disposed sector plates each pivotally mounted at its front end upon a wheel stud, and a ground roller extending between rearward portions of the sector plates; and a height-of-cut adjustment mechanism adjustably connecting the frame and the ground roller assembly, including a bolt pin in one of them and a plurality of seats in the other angularly spaced about the pivotal mountings, whereby the pivotal relationship between the frame and said assembly may be selected and locked.

RICHARD D. CLEMSON.

REFERENCES CITED

The following references are of record in the file of this patent:

UNITED STATES PATENTS

| Number | Name | Date |
| --- | --- | --- |
| 2,105,161 | Platt | Jan. 11, 1938 |
| 2,252,126 | Kersey | Aug. 12, 1941 |
| 2,260,801 | Clemson | Oct. 28, 1941 |
| 2,269,920 | Seaver | Jan. 13, 1942 |
| 2,303,055 | Lardi | Nov. 24, 1942 |
| 2,388,165 | Lowe et al. | Oct. 30, 1945 |
| 2,413,404 | Black | Dec. 31, 1946 |
| 2,414,077 | Wells | Jan. 7, 1947 |
| 2,460,797 | Allington | Feb. 8, 1949 |
| 2,486,969 | Nelson | Nov. 1, 1949 |
| 2,490,171 | Swahnberg | Dec. 6, 1949 |
| 2,496,973 | Worthington | Feb. 7, 1950 |